United States Patent
Cronin et al.

(10) Patent No.: US 10,953,729 B2
(45) Date of Patent: Mar. 23, 2021

(54) DEVICE FOR CONTROLLING THE AIR DISCHARGE FROM AN AIR OUTLET

(71) Applicant: Ford Global Technologies, LLC, Dearborn, MI (US)

(72) Inventors: Ger Anthony Cronin, Pulheim (DE); Simon Arnold, Wickford (GB); Gregor Whelan, Great Dunmow (GB); Peter Durston, Westcliff-on-Sea (GB)

(73) Assignee: Ford Global Technologies, LLC, Dearborn, MI (US)

( * ) Notice: Subject to any disclaimer, the term of this patent is extended or adjusted under 35 U.S.C. 154(b) by 170 days.

(21) Appl. No.: 16/108,764

(22) Filed: Aug. 22, 2018

(65) Prior Publication Data

US 2019/0092140 A1    Mar. 28, 2019

(30) Foreign Application Priority Data

Sep. 26, 2017    (DE) .......................... 102017217087.5

(51) Int. Cl.
*B60H 1/34* (2006.01)
*B60H 1/24* (2006.01)
(Continued)

(52) U.S. Cl.
CPC ....... *B60H 1/3421* (2013.01); *B60H 1/00285* (2013.01); *B60H 1/246* (2013.01);
(Continued)

(58) Field of Classification Search
CPC .. B60H 1/3421; B60H 1/00285; B60H 1/246; B60H 2001/003; B60H 2001/3471;
(Continued)

(56) References Cited

U.S. PATENT DOCUMENTS 6,152,522 A * 11/2000 Boulay ................. B60H 1/247
                                                        296/208
6,347,987 B1 * 2/2002 Ichishi ................. B60H 1/247
                                                        454/153
(Continued)

FOREIGN PATENT DOCUMENTS

DE         10101338 A1    7/2002
DE    102005019025 A1   10/2006
(Continued)

*Primary Examiner* — Steven B McAllister
*Assistant Examiner* — Allen R Schult
(74) *Attorney, Agent, or Firm* — David Coppiellie; Price Heneveld LLP

(57) ABSTRACT

A device for controlling the air flow from an air outlet of a heating and/or ventilation and/or air-conditioning system of a motor vehicle. The air outlet has an air discharge opening which is for discharging air into an inner vehicle space and over which there extends at least one elongate slat which can be pivoted about a longitudinal axis in order to influence an air flow flowing through the air discharge opening and whose pivot position can be adjusted by at least one adjustment mechanism which is coupled to the slat. At least one actuation mechanism, which is fitted to a vehicle seat when the vehicle seat is mounted in the inner vehicle space, moves into mechanical operational engagement with the adjustment mechanism and brings about an adjustment of the at least one slat in accordance with a position of the vehicle seat with respect to the inner vehicle space.

18 Claims, 7 Drawing Sheets

(51) Int. Cl.
*B60N 2/90* (2018.01)
*B60N 2/005* (2006.01)
*B60N 2/02* (2006.01)
*B60N 2/56* (2006.01)
*B60N 2/06* (2006.01)
*B60H 1/00* (2006.01)

(52) U.S. Cl.
CPC ............ *B60N 2/005* (2013.01); *B60N 2/0292* (2013.01); *B60N 2/06* (2013.01); *B60N 2/56* (2013.01); *B60N 2/919* (2018.02); *B60H 2001/003* (2013.01); *B60H 2001/3471* (2013.01)

(58) Field of Classification Search
CPC ...... B60N 2/919; B60N 2/005; B60N 2/0292; B60N 2/06; B60N 2/56
USPC ......................................................... 454/155
See application file for complete search history.

(56) References Cited

U.S. PATENT DOCUMENTS

| | | |
|---|---|---|
| 6,491,578 B2 | 12/2002 | Yoshinori et al. |
| 6,547,301 B1 | 4/2003 | Keller |
| 6,857,955 B1 | 2/2005 | Held |
| 2002/0019213 A1* | 2/2002 | Yoshinori .......... B60H 1/00742 454/155 |
| 2009/0038774 A1 | 2/2009 | Ogiso et al. |
| 2015/0266404 A1* | 9/2015 | Sakane .............. B60H 1/00285 454/152 |

FOREIGN PATENT DOCUMENTS

| | | |
|---|---|---|
| DE | 102008034167 A1 | 4/2009 |
| GB | 444470 | 9/1935 |
| KR | 100222889 B1 | 10/1999 |

* cited by examiner

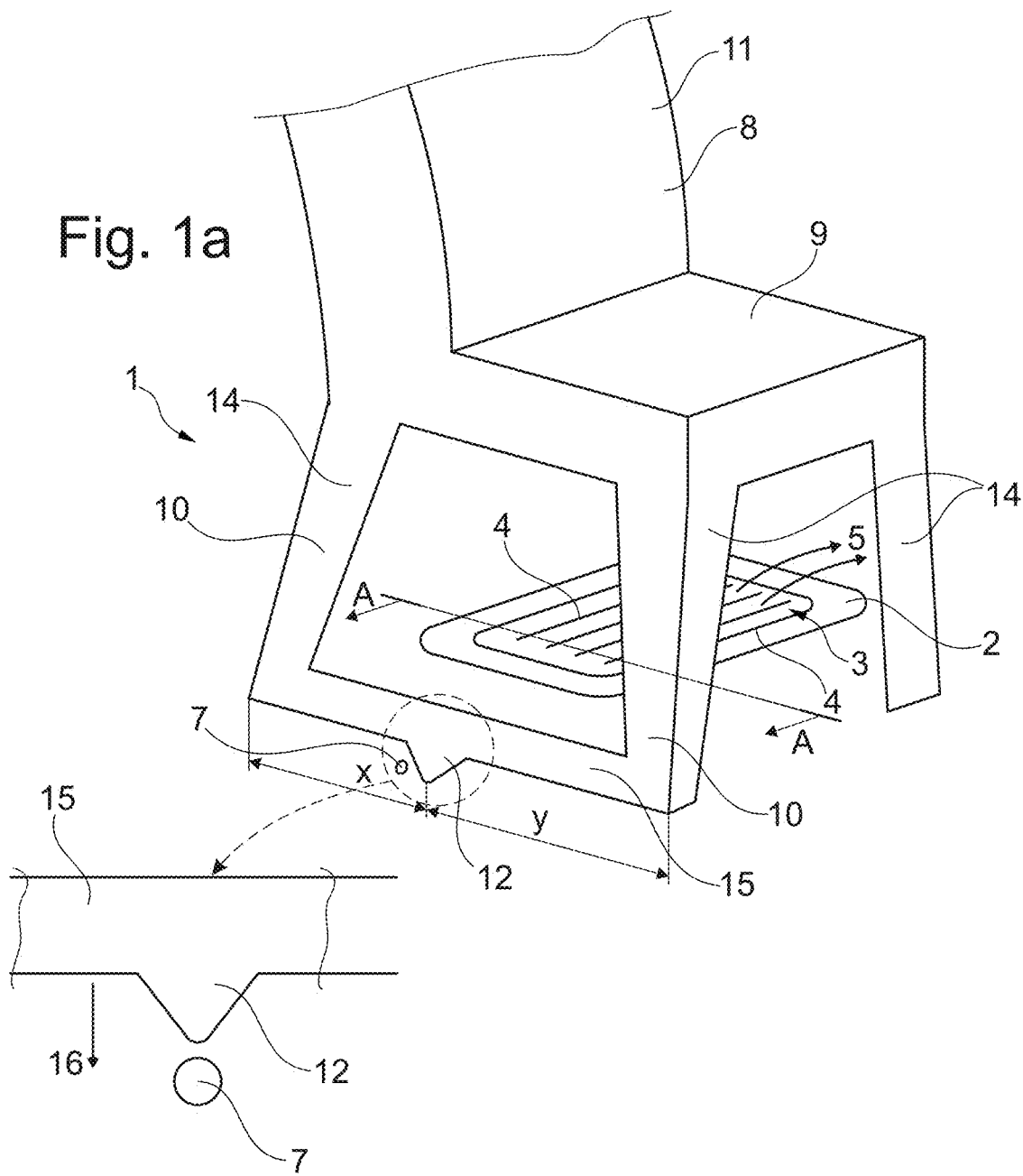

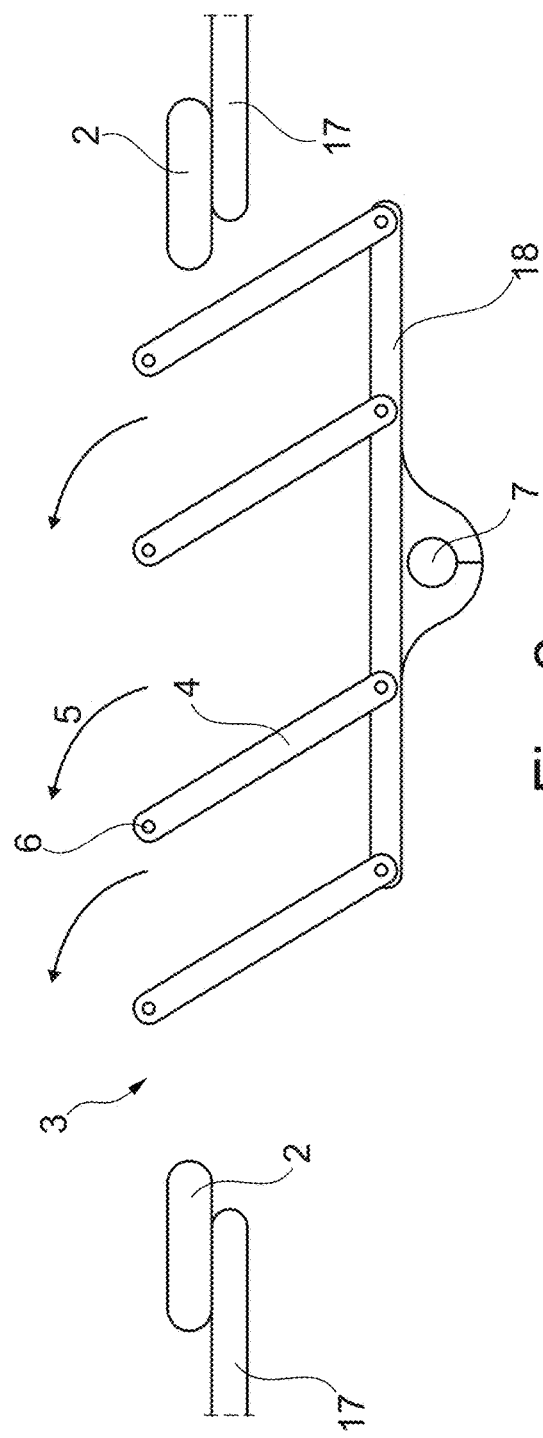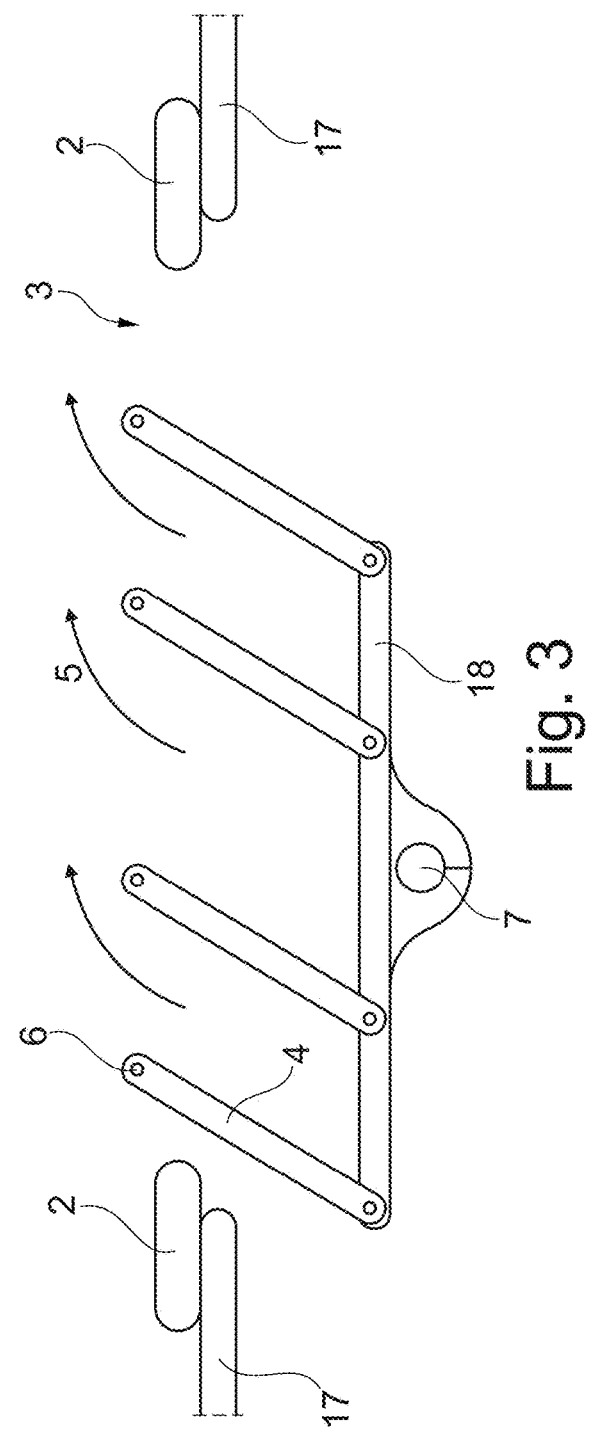

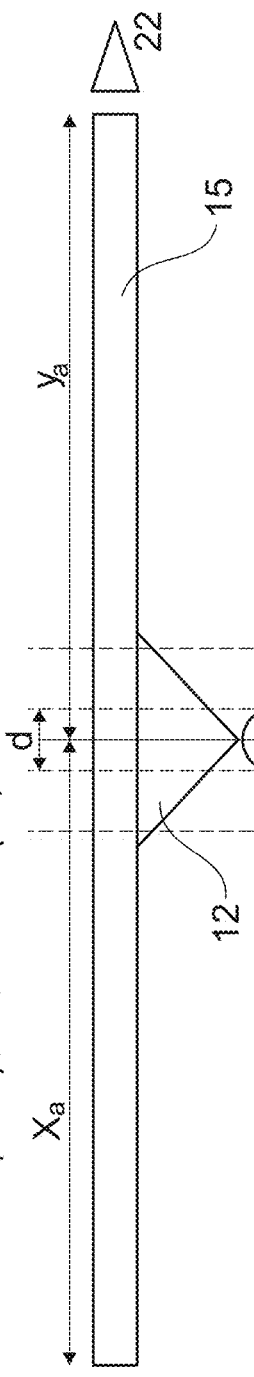
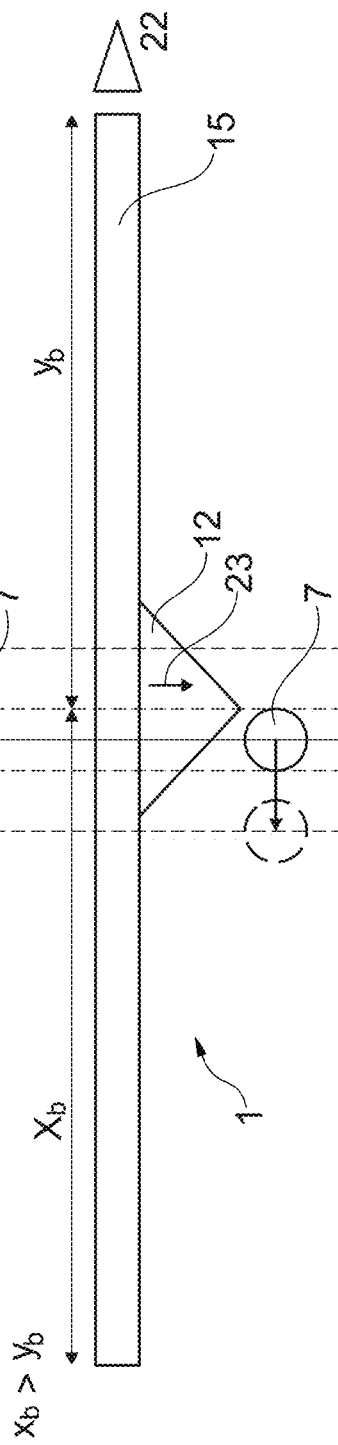
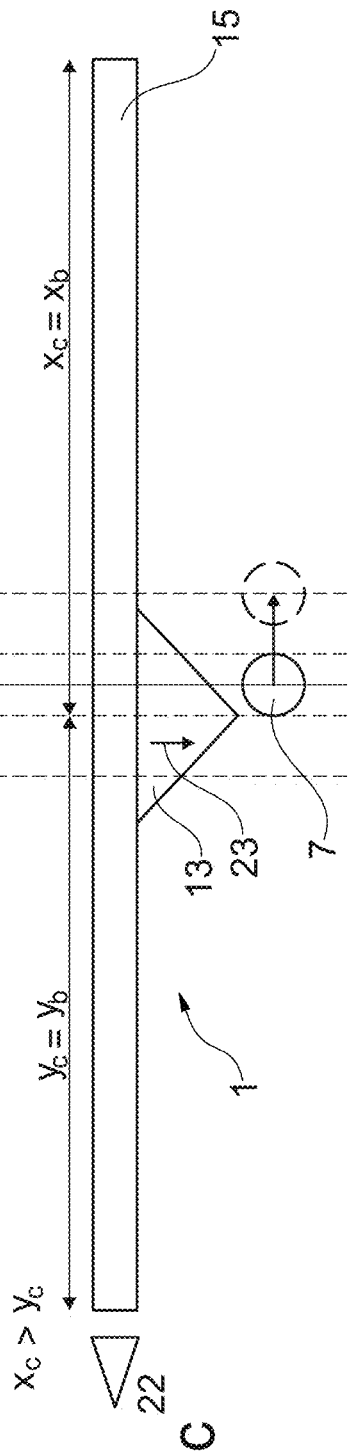

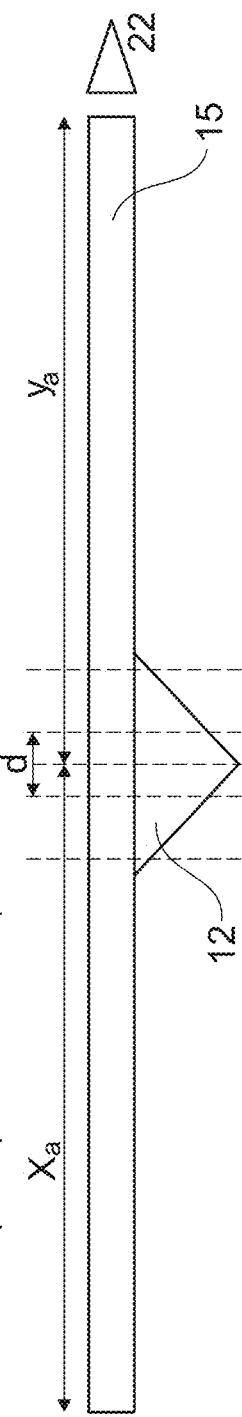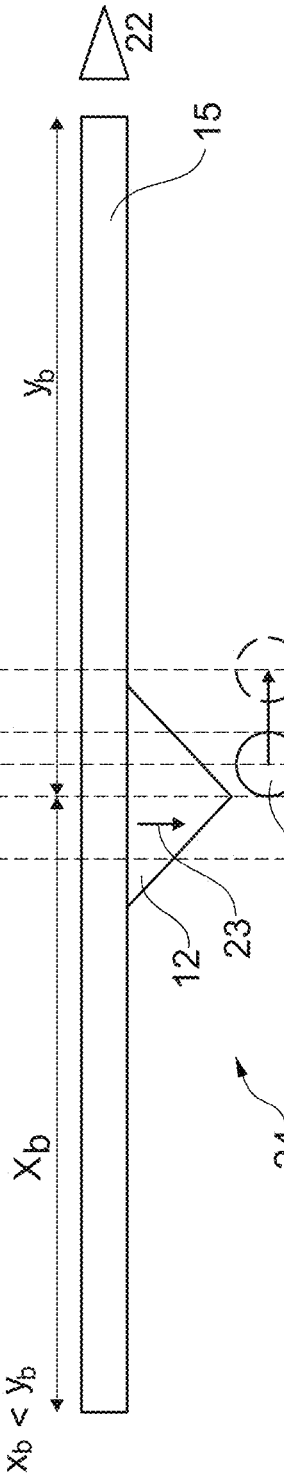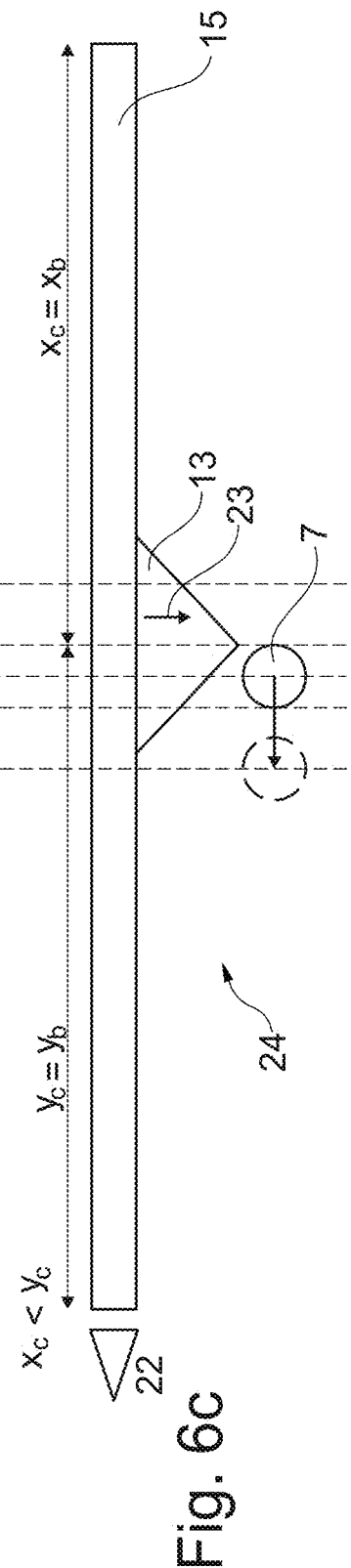

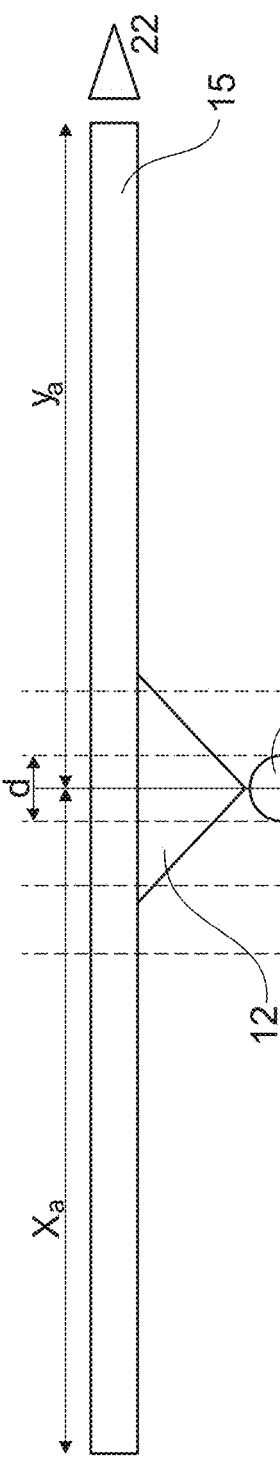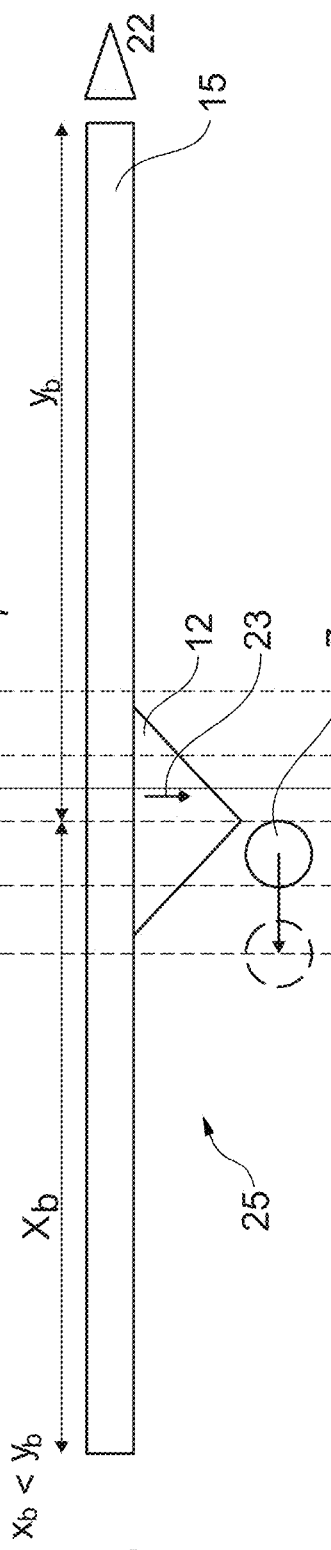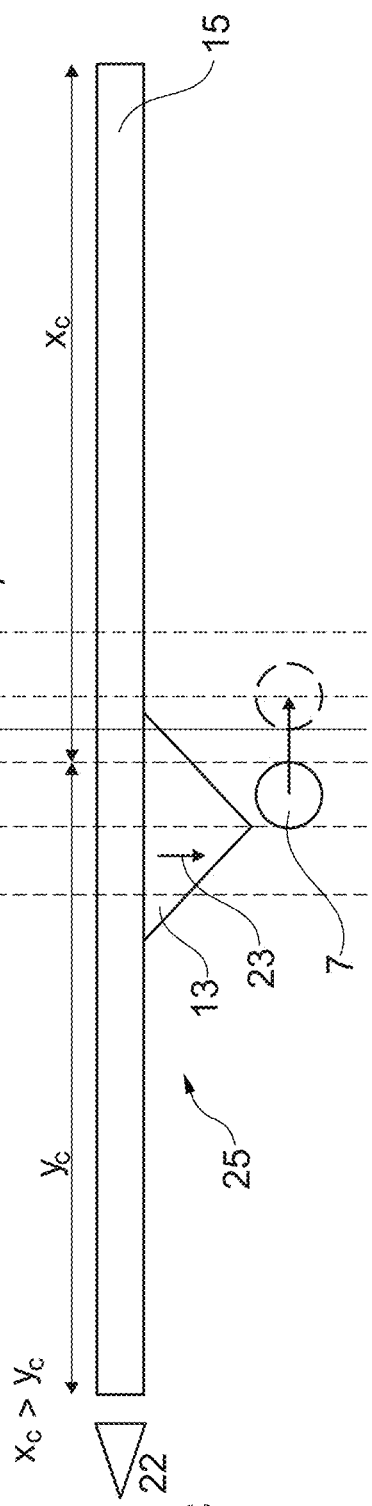

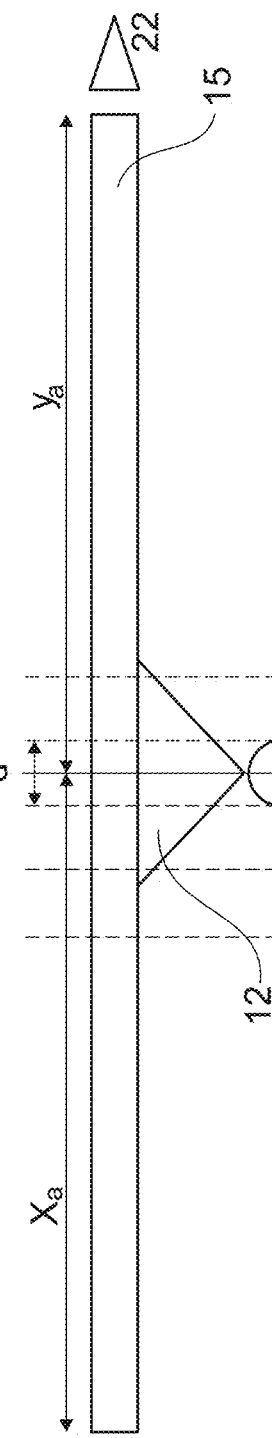
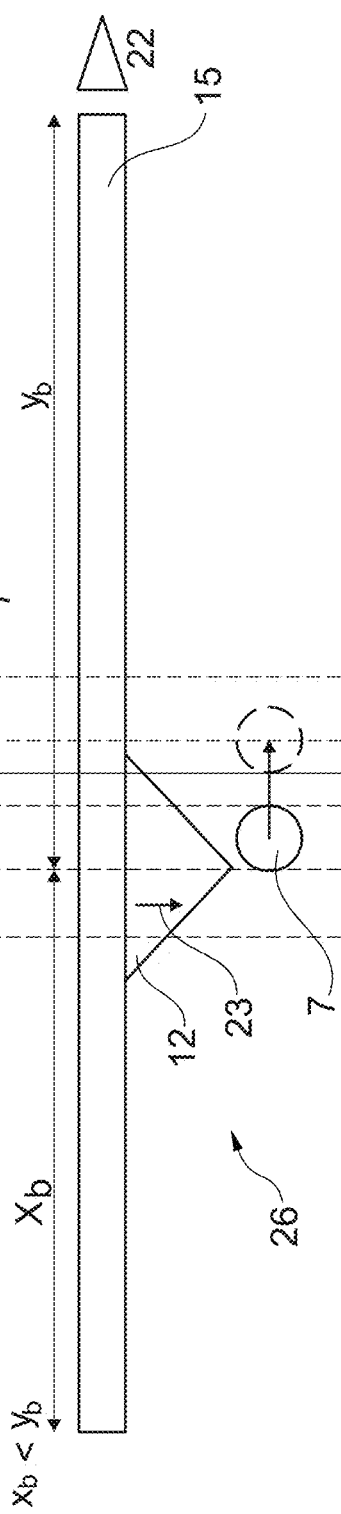
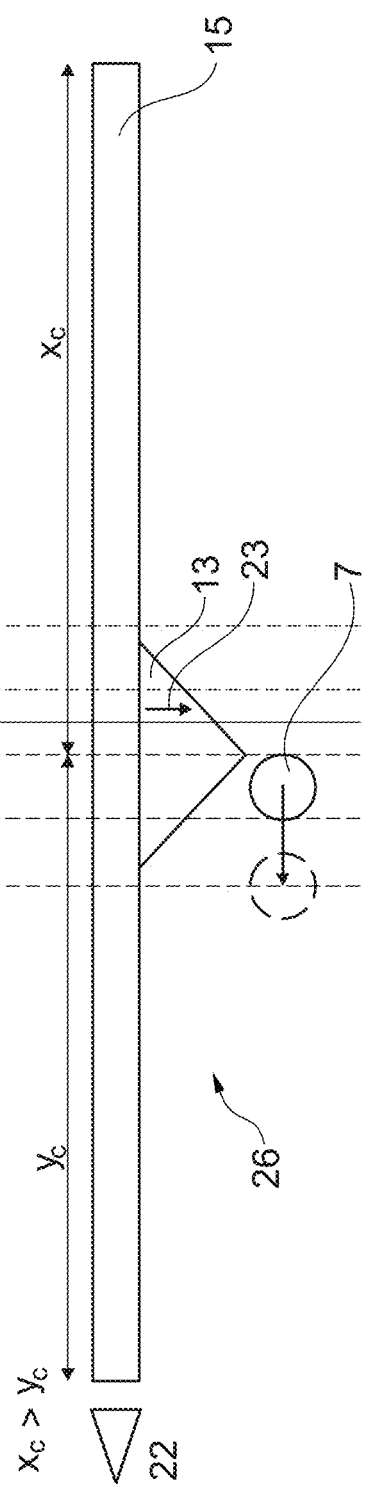
Fig. 8a
Fig. 8b
Fig. 8c

DEVICE FOR CONTROLLING THE AIR DISCHARGE FROM AN AIR OUTLET

FIELD OF THE INVENTION

The present invention generally relates to vehicle air flow control, and more particularly relates to a device for controlling the air discharge from an air outlet of a heating and/or ventilation and/or air-conditioning system of a motor vehicle in an inner vehicle space.

BACKGROUND OF THE INVENTION

The term air outlet, such as an air register, or register for short, is used in motor vehicles to refer to a component for discharging and directing a controlled quantity of ambient air or heated or cooled air in the inner vehicle space. The intensity of the discharged air flow may, for example, be adjusted by use of a fan which is arranged upstream of the air outlet.

Generally, an air outlet contains a form of grid which is in most cases formed by a number of adjustable slats, also referred to as air baffles, ribs or vanes by use of which the flow direction of the air flow discharged from an air discharge opening of the air outlet can be varied. The adjustment of the slats is generally carried out manually by use of slides which are arranged on groups of slats or by use of adjustment wheels which are arranged beside the groups of slats. Air outlets with non-adjustable slats are also known, in which the air flow direction generally cannot be varied.

In the inner vehicle space, generally a plurality of air outlets are arranged so as to be distributed over the width of the instrument panel, for example, one on the left and right and one or two in the center in order to be able to comply with the individual requirements of different vehicle occupants in terms of ventilation, heating and cooling. Furthermore, it is known to fit air outlets in the floor, side and roof region of the inner vehicle space, wherein these air outlets may have non-adjustable, fixedly arranged or also adjustable slats.

For example, KR 100222889 B1 discloses an air-conditioning system for a vehicle. The vehicle has two seats which are arranged one behind the other with respect to the vehicle travel direction. Between the front and the rear vehicle seat, in the floor region an additional air outlet with adjustable slats is provided in order to also be able to supply vehicle occupants sitting on the rear vehicle seat with air from the air-conditioning system.

U.S. Patent Application Publication No. 2009/0038774 A1 (also DE 10 2008 034 167 A1) further discloses an air-conditioning system which is for a vehicle having at least three seat rows and which has air outlets arranged on the instrument panel, in the roof and in the foot or floor region of an inner vehicle space.

A similar system for air distribution of an air-conditioning system of a vehicle in the inner space thereof is also disclosed in U.S. Pat. No. 6,491,578 B2, wherein there is additionally also described a vehicle seat which is connected via a flexible air guiding channel to the air distributor system of the air-conditioning system so that the air can also be blown through the seat and back cushion of the vehicle seat and in this manner supplied to a vehicle occupant.

U.S. Pat. No. 6,547,301 B1 further discloses a floor mat for an inner vehicle space which has air distribution channels and floor-side air outlets which are connected thereto in order to be able to supply air to vehicle occupants both in a first and in a second seat row.

An air channel extension which can be subsequently connected to an existing air outlet in an inner vehicle space of a vehicle having an air outlet which is provided with adjustable slats is further disclosed in U.S. Pat. No. 6,857,955 B1. Using the extension, for example, it is possible for air to be directed from a front-seat-side air outlet to a rear seat row and supplied in a selective manner to a vehicle occupant sitting at that location.

GB 444 470 A further describes a ventilation device for a vehicle which has air guiding channels which are arranged in or below the vehicle floor and which directs air to air outlets arranged below vehicle seats and/or in vehicle side walls.

Against this background, it would be desirable to provide a device which is improved with regard to the comfort for vehicle occupants for controlling the air flow from an air outlet of a heating and/or ventilation and/or air-conditioning system of a motor vehicle. Furthermore, it would be desirable for the device to be simple to construct and cost-effective to produce.

SUMMARY OF THE INVENTION

It should be noted that the features set out individually in the following description can be combined with each other in any technically advantageous manner and set out other embodiments of the disclosure. The description additionally characterizes and specifies the disclosure in particular in connection with the figures.

In a device, according to one embodiment, for controlling the air flow from an air outlet of a heating and/or ventilation and/or air-conditioning system of a motor vehicle, the air outlet has an air discharge opening which is for discharging air into an inner vehicle space and over which there extends at least one elongate slat which can be pivoted about a longitudinal axis in order to influence an air flow flowing through the air discharge opening and whose pivot position can be adjusted by use of at least one adjustment mechanism which is coupled to the slat. That is to say, by use of corresponding pivoting of the at least one slat using the adjustment mechanism the direction of the air outlet relative to the opening plane of the air discharge opening can be influenced or controlled. If the slat is, for example, orientated substantially perpendicularly to the opening plane of the air discharge opening, it does not substantially influence the air flow of the air flowing out of the air discharge opening (that is to say, the air flows substantially perpendicularly to the opening plane of the air discharge opening from the air outlet), whereas it redirects the air flow in the event of a pivot position which differs from this position in one direction or the other (that is to say, the air then flows out of the air outlet in an oblique/inclined manner with respect to the opening plane of the air discharge opening). If the slat can even be orientated substantially parallel with the opening plane of the air discharge opening and if the slat surface (in the case of a plurality of slats, the overall shape and overall size) substantially corresponds in terms of shape and size to the shape and size of the surface of the air discharge opening, the air flow as a result of the air outlet in such a pivot position of the slat(s) can be at least considerably weakened in terms of its intensity or even completely stopped or interrupted.

The device according to one embodiment further contains a vehicle seat to which there is fitted at least one actuation mechanism which, when the vehicle seat is mounted in the inner vehicle space, moves into mechanical operational engagement with the adjustment mechanism of the air outlet and which brings about an adjustment of the at least one slat in accordance with a position of the vehicle seat with respect to the inner vehicle space. The term "vehicle seat" in the context of the present disclosure may be understood to refer to all components which form a vehicle seat in known manner, that is to say, for example, a seat member, a backrest, one or two arm rests, a headrest, a lower framework or frame which carries the above-mentioned components and the like.

The mechanical operational engagement between the at least one actuation mechanism and the at least one adjustment mechanism may, for example, bring about a rotation of the adjustment mechanism, a displacement of the adjustment mechanism along a straight or curved movement path or a combination thereof.

According to one embodiment, a change of the position of the vehicle seat in the inner vehicle space as a result of the operational engagement between the actuation mechanism fitted to the vehicle seat and the adjustment mechanism of the air outlet changes the pivot position of the at least one slat of the air outlet, wherein the change of the slat pivot position is carried out in the context of an incoming flow of air which is perceived to be particularly comfortable for a vehicle occupant from the air outlet in the respective position of the vehicle seat. That is to say, in particular the flow direction of the air flowing through the air outlet is adapted in a mechanical manner (mechanical operational engagement) automatically to the position of the vehicle seat in the inner vehicle space in order to ensure an optimum incoming flow which is perceived to be comfortable for the vehicle occupant seated on the vehicle seat. A manual adaptation of the air flow direction at the air outlet by the vehicle occupant to the current position of the vehicle seat is no longer required.

It should be understood that the general term "position" in the context of the present disclosure comprises a position of the vehicle seat in the inner vehicle space which can be adjusted and changed by a vehicle occupant in the assembled state of the vehicle seat and/or a position which can be determined by the assembly of the vehicle seat in the inner vehicle space. For example, a position of the vehicle seat in the inner vehicle space, which position can be determined by use of the assembly, may define an orientation of the vehicle seat in the inner vehicle space which can thereby be predetermined in principle, for example, in the travel direction of the vehicle, that is to say, in the direction of the front or windshield of the vehicle, or counter to the travel direction of the vehicle, that is to say, in the direction toward the inner vehicle space. A combination of a position of the assembled vehicle seat in the inner vehicle space as adjusted by a vehicle occupant and a position which is predetermined itself by an assembly of the vehicle seat in the inner vehicle space is also included by the general term "position" which is used herein. Assembly in the context of the present disclosure is also intended to be understood to refer to the removal of a vehicle seat which can be disassembled from the inner vehicle space and the reinstallation thereof, for example, in an orientation which is the reverse of the orientation of the vehicle seat prior to disassembly.

The device advantageously enables a change of the pivot position of the at least one slat of the air outlet, which change is automatically brought about by changing the position of the vehicle seat in the inner vehicle space, in a mechanical manner (mechanical operational engagement between actuation mechanism and adjustment mechanism) without the vehicle occupant having to subsequently manually change the flow direction of the air flowing out of the air outlet or adapt it to the respective position of the vehicle seat. The air flow direction can thus be automatically adapted, for example, to an adjusted spacing and/or an adjusted orientation of the vehicle seat from or to the air outlet in the context of a comfortable incoming flow for the vehicle occupant seated on the vehicle seat. The mechanically provided operational engagement between the actuation mechanism of the vehicle seat and the adjustment mechanism of the air outlet is robust, long-lasting and maintenance-free and can be produced in a structurally simple and cost-effective manner.

According to an advantageous embodiment, the vehicle seat can be assembled in at least two different positions in the inner vehicle space. In the first position, the vehicle seat is in this instance orientated substantially in the travel direction of the motor vehicle, that is to say, in the direction of a front or windshield of the vehicle, and in the second position directed substantially counter to the travel direction of the motor vehicle, that is to say, substantially toward the inner side of the inner vehicle space. The term "travel direction" is intended in this instance to be understood to refer to the forward travel direction of the vehicle. That is to say, the at least two positions of the vehicle seat according to this embodiment can be adjusted by rotating through approximately 180° about the vertical axis of the vehicle seat. Since a vehicle occupant seated in the vehicle seat thereby also changes his seat position by approximately 180° with respect to the vertical axis thereof, an advantageous adjustment of the pivot position of the at least one slat of the air outlet is one which adapts the flow direction of the air flowing out of the air outlet in accordance with an arrangement of the air outlet in the inner vehicle space relative to the vehicle seat in such a manner that any flow or a flow which is perceived to be comfortable for the vehicle occupant seated in the vehicle seat is ensured both in the first and in the second adjustable seat position.

Another advantageous embodiment makes provision for at least two actuation mechanism to be fitted to the vehicle seat, wherein the first actuation mechanism when the vehicle seat is assembled in the first position moves into mechanical operational engagement with the adjustment mechanism and displaces it in a first actuation direction as far as a first actuation position and the second actuation mechanism when the vehicle seat is assembled in the second position moves into mechanical operational engagement with the same adjustment mechanism and displaces it in a second actuation direction counter to the first actuation direction as far as a second actuation position. It is thereby possible to produce the directional change already mentioned above of the air flowing out of the air outlet in a simple manner from the air outlet in order to ensure a flow of air against the vehicle occupant seated on the passenger seat in both positions which differ substantially by 180° with respect to a vertical axis of the vehicle seat. The adjustment of the adjustment mechanism may in this instance, for example, be carried out by rotation of the adjustment mechanism brought about by the two actuation mechanisms fitted to the vehicle seat and by a displacement of the actuation mechanisms along a straight or curved movement path or a combination thereof.

According to another advantageous embodiment, the adjustment path of the adjustment mechanism between the first actuation position and the second actuation position includes a neutral position in which the at least one slat of the air outlet assumes a pivot position in which the air flow flowing through the air discharge opening flows out substantially perpendicularly to the opening plane of the air discharge opening. In this instance, the slat is advantageously also orientated substantially perpendicularly to the opening plane of the air discharge opening. Consequently, a displacement of the adjustment mechanism from the first actuation position into the second actuation position and vice versa leads to a reversal of direction of the air flowing out of the air outlet with respect to the neutral position, which ensures a comfortable flow against a vehicle occupant seated on the vehicle seat in both adjustable seat positions which differ by 180° with respect to the vertical axis thereof.

In order to ensure a precise and defined displacement of the adjustment mechanism by the at least one actuation mechanism which is fitted to the vehicle seat in a simple manner, the adjustment mechanism is according to another advantageous embodiment resiliently loaded in the direction of the neutral position thereof. In this embodiment, the adjustment mechanism is thus by use of at least one resilient element, for example, a pressure or tension spring, always urged in the direction of the neutral position thereof. The actuation mechanism of the vehicle seat which interacts with the adjustment mechanism of the air outlet consequently counteracts the pressure or tensile force applied by the resilient element to the adjustment mechanism in the event of a displacement away from the neutral position thereof, which during the mechanical operational engagement, between the actuation mechanism and the adjustment mechanism ensures a permanent abutment of the adjustment mechanism against the actuation mechanism and consequently a precise (desired) and permanently defined adjustment of the pivot position of the at least one slat for influencing the air flow flowing out through the air outlet. In this manner, for example, an undesirable uncontrolled "folding away" of the slat, for example, as a result of vibrations which occur during travel of the vehicle, is effectively prevented.

In yet another advantageous embodiment, the vehicle seat has a lower framework which carries a seat face. According to this embodiment the at least one actuation mechanism is fitted to the lower framework which can also be referred to as a frame of the vehicle seat. The lower framework which is generally formed from a solid, rigid material, for example, metal, enables sufficiently secure fitting of the actuation mechanism to the vehicle seat and consequently constitutes a fixed abutment for producing the actuation force which is required for the displacement of the adjustment mechanism. In a maintenance-free embodiment, the actuation mechanism may, for example, be constructed integrally with the lower framework of the vehicle seat or at least connected to the lower framework in a materially engaging manner, for example, by use of welding or adhesive bonding. Alternatively, it can also be fitted to the lower framework by use of a screw and/or clamping connection so that an adaptation of the position of the actuation mechanism to the lower framework is also subsequently possible without significant complexity.

Yet another advantageous embodiment, makes provision for the lower framework to be retained so as to be secured in terms of movement with respect to the inner vehicle space after the assembly in the inner vehicle space. That is to say, in this embodiment only the respective assembly position of the vehicle seat in the inner vehicle space brings about a displacement of the adjustment mechanism in order to adapt the pivot position of the at least one slat of the air outlet to the respective installation position of the vehicle seat. After assembly, as a result of the fixed arrangement of the lower framework in the inner vehicle space, there is produced no further displacement of the adjustment mechanism. A seat face and/or backrest and/or arm rest(s) which is/are carried by the lower framework of the vehicle seat may of course continue to be adjustable in conventional manner with respect to the lower framework so that a vehicle occupant seated on the vehicle seat can assume a seated position which is comfortable for him. The seat face may thus be able to be displaced with respect to the lower framework, for example, in the longitudinal direction, and/or the backrest may be able to be inclined relative to the seat face. In this embodiment, however, such position changes of the vehicle seat with respect to the inner vehicle space do not lead to an adjustment of the adjustment mechanism of the air outlet.

Another advantageous embodiment makes provision for the air outlet to be arranged below the vehicle seat. Preferably, the air outlet is arranged in this instance on or in the floor of the inner vehicle space. The automatic displacement of the adjustment mechanism of the air outlet which is brought about by a position change of the vehicle seat and which is described herein ensures in this instance in a particularly advantageous manner by use of corresponding adjustment of the pivot position of the at least one slat a selective and continuous flow to the foot/leg region of a vehicle occupant seated on the vehicle seat with air discharged through the air outlet in accordance with the respective position/orientation of the vehicle seat in the inner vehicle space.

According to yet another advantageous embodiment, the adjustment mechanism is constructed in a rod-like manner at least in the engagement region with the actuation mechanism, wherein the actuation mechanism for the operational engagement with the adjustment mechanism applies a force thereto in the radial direction of the rod-like adjustment mechanism. In this manner, a simple-to-produce, robust, always separable (for example, for easy disassembly and reinstallation of the vehicle seat), maintenance-free mechanical operational connection between the actuation mechanism of the vehicle seat and the adjustment mechanism of the air outlet can be provided. The rod-like cross section may, for example, be constructed to be round (circular or elliptical) or also angular, for example, triangular, square or having even more corners, depending on which shape is particularly highly suitable for an operational connection to the corresponding actuation mechanism. As already noted above, the displacement movement of the adjustment mechanism brought about by the actuation mechanism may include both a displacement and a rotation of the adjustment mechanism or a combination thereof.

According to another embodiment, the actuation mechanism is constructed in a wedge-like manner, wherein an adjustment of the at least one slat is produced as a result of a relative movement between the actuation mechanism which is in operational engagement with the adjustment mechanism and this adjustment mechanism, during which the adjustment mechanism slides along a side face of the wedge-like actuation mechanism which extends obliquely relative to the movement direction of the actuation mechanism. It is thereby readily possible for both a displacement and a rotation of the adjustment mechanism to be produced by the actuation mechanism.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 1a is a perspective view of one embodiment of a device for controlling air flow from an air outlet;

FIG. 1b is an enlarged side view of a cut-out taken from FIG. 1a;

FIG. 2 is a cross-sectional view of a portion of the device from FIG. 1a in the first actuation position thereof along the line of section A-A shown in FIG. 1a;

FIG. 3 is a cross-sectional view of a portion of the device from FIG. 1a in a second actuation position along the line of section A-A shown in FIG. 1a;

FIG. 5a is a partial side view of a conventional device which is not in accordance with the invention and which serves only comparison purposes;

FIG. 5b is a partial side view of the device illustrated in FIG. 1a in the first actuation position thereof;

FIG. 5c is a partial side view of the device in FIG. 1a in the second actuation position;

FIG. 6a is a partial side view of a conventional device which is not in accordance with the invention and which serves only comparison purposes;

FIG. 6b is a partial side view of another embodiment of a device in a first actuation position;

FIG. 6c is a partial side view of the device shown in FIG. 6b in a second actuation position;

FIG. 7a is a partial side view of a conventional device which is not in accordance with the invention and which serves only comparison purposes;

FIG. 7b is a partial side view of yet another embodiment of a device in a first actuation position;

FIG. 7c is a partial side view of the device shown in FIG. 7b in a second actuation position;

FIG. 8a is a partial side view of a conventional device which is not in accordance with the invention and which serves only comparison purposes;

FIG. 8b is a partial side view of yet another embodiment of a device in a first actuation position; and FIG. 8c is a partial side view of the device shown in FIG. 8b in a second actuation position.

DETAILED DESCRIPTION OF THE PREFERRED EMBODIMENTS

Figure 4:
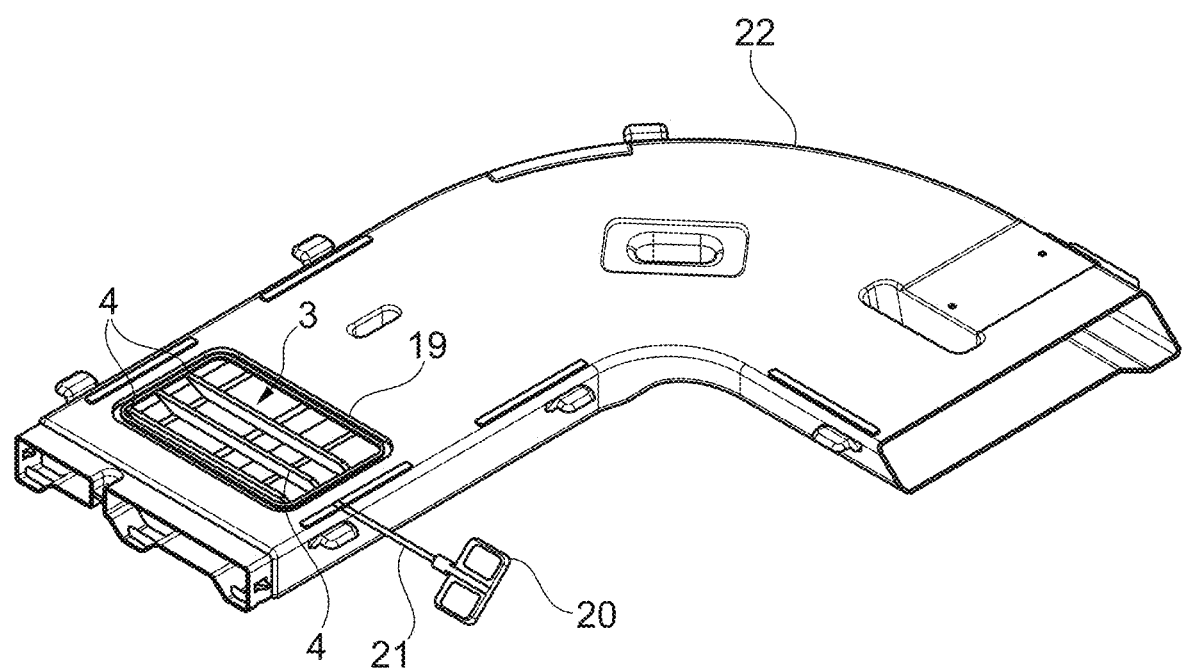
FIG. 4 is a perspective view of an air outlet of another embodiment of a device.

In the various figures, components which are equivalent in terms of their function are always given the same reference numerals so that they are generally also only described once.

FIG. 1a is a schematic, perspective view of an embodiment of a device 1 according to one embodiment when viewed obliquely from the front. The device 1 serves to control the air flow from an air outlet 2 of a heating and/or ventilation and/or air-conditioning (HVAC) system of a motor vehicle which is not illustrated in greater detail. It should be understood that the device 1 illustrated in FIGS. 1a and 1b is illustrated in a state mounted in an inner vehicle space of the motor vehicle not shown in greater detail.

As can be seen in FIG. 1a, the air outlet 2 has an air discharge opening 3 for discharging air into the inner vehicle space. Extend over the air discharge opening 3 are a plurality of elongate slats 4 which extend parallel with each other. The slats 4 can be pivoted in order to influence an air flow 5 flowing through the air discharge opening 3 about a longitudinal or pivot axis 6 (see FIGS. 2 and 3). In the embodiment of the device 1 illustrated in FIGS. 1a and 1b, the pivot position of the slats 4 is adjustable via an adjustment mechanism 7 which is coupled to the slats 4, as will be explained below in detail. The device 1 illustrated in FIG. 1a has only a single adjustment mechanism 7 for adjusting the slats 3 of the air outlet 2.

Furthermore, the device 1 illustrated in FIG. 1a has a vehicle seat 8 which is illustrated only schematically. The vehicle seat 8 shown has as a main component substantially a lower framework 10 (also referred to as a frame) which carries a seat face 9 or a seat upholstery portion and a backrest 11 which is also carried by the lower framework 10. It will be understood that the seat face 9 and/or the backrest 11 of the vehicle seat 8 can be adjusted in conventional manner with respect to the lower framework 10 in order to be able to provide a comfortable seating position for a vehicle occupant (not illustrated) seated on the vehicle seat 8. The adjustability of the seat face 9 and/or the backrest 11 with respect to the lower framework 10 is not absolutely necessary for the device 1 shown in FIG. 1a.

In the device 1 illustrated in FIG. 1a, the air outlet 2 is arranged below the vehicle seat 8. In particular the air outlet 2 is arranged on or in a floor (not illustrated) of the inner vehicle space and connected thereto. The opening plane of the air discharge opening 3 consequently extends substantially parallel with the base face below the vehicle seat 8.

The lower framework 10 of the vehicle seat 8 of the embodiment of the device 1 shown in FIG. 1a is, after the assembly of the vehicle seat 8 in the inner vehicle space, further retained so as to be secured in terms of movement with respect to the inner vehicle space, for example, corresponding screw connections which, for subsequent disassembly and reconstruction of the vehicle seat 8 out of or in the inner vehicle space, can advantageously be released in a non-destructive manner without significant complexity.

A total of two actuation mechanisms 12 and 13 are fitted to the vehicle seat 8 of the device 1, wherein the actuation mechanism 12 cannot be seen in FIG. 1a since it is located at the left side of the vehicle seat 8 facing away from the viewer.

FIG. 1a shows that the actuation mechanism 12 in the vehicle seat 8 is fitted to the lower framework 10 thereof. The lower framework 10 of the vehicle seat 8 contains different, substantially rigid struts 14, 15, which are produced, for example, from metal and which securely connect the seat face 9 and the backrest 11 to the floor of the inner vehicle space. FIG. 1a, by way of example, illustrates three perpendicular struts 14 which extend from the respective corners of the seat face 9 to the floor of the inner vehicle space and a horizontal connection strut 15 which connects the front right and rear right perpendicular struts 14 to each other at the floor side (when viewed from the seated direction of a vehicle occupant seated on the vehicle seat 8). It will be understood that more or fewer struts 14, 15 with a potentially different orientation from the one shown in FIG. 1a may also be provided.

A rear left perpendicular strut 14 of the lower framework 10 of the vehicle seat 8 cannot be seen in the illustration of FIG. 1a. However, it should be understood that the front left and rear left perpendicular strut 14 in a similar manner to the struts 14 at the right side of the vehicle seat 8 illustrated in FIG. 1a are also connected a horizontal connection strut 15 extending at the floor side. The lower framework 10 of the vehicle seat 8 illustrated in FIG. 1a is consequently, at least with respect to the struts 14 and 15 described in this instance, constructed substantially symmetrically at the right and left side but this is not absolutely necessary.

In FIG. 1a, it can further be seen that the actuation mechanism 12 is fitted to the right-side horizontal connection strut 15 of the lower framework 10. The actuation mechanism 13 already mentioned above is in a similar manner fitted to the left-side horizontal connection strut 15 of the lower framework 10 which cannot be seen in FIG. 1a. For a particularly simple, cost-effective production of the vehicle seat 8, the actuation mechanisms 12 and 13 are in the embodiment illustrated in FIG. 1a in each case constructed integrally with the connection struts 15 or at least connected to them in a materially engaging manner, for example, welded or adhesively bonded.

As can further be seen in FIG. 1a, the actuation mechanism 12 is in mechanical operational engagement with the adjustment mechanism 7. In particular, the adjustment mechanism 7 of the embodiment illustrated in FIG. 1a, which is constructed at least in the region of the operational engagement in a rod-like manner with a round cross section, is laterally in abutment with the actuation mechanism 12 which is constructed in this instance in a wedge-like manner, in particular with one of the side faces thereof. Consequently, a change of the position of the vehicle seat 8, in this instance in particular a change of the position of the lower framework 10 of the vehicle seat 8 relative to the inner vehicle space, brings about an adjustment of the slats 4 of the air outlet 2 which are coupled to the adjustment mechanism 7.

In FIG. 1a, the state of the vehicle seat 8 mounted in the inner vehicle space is shown. Consequently, the adjustment mechanism 7 in this illustration is already in a first actuation position which is located in a rear (backrest-side) portion of the horizontal connection strut 15 designated x in FIG. 1a. The opposing front portion of the connection strut 15 is designated y in FIG. 1a. The actuation mechanism 12 is arranged at the transition location between the rear portion x and the front portion y.

FIG. 1b is an enlarged side view of a circled region in FIG. 1a to explain the situation prior to the operational engagement between the actuation mechanism 12 and the adjustment mechanism 7. The illustration of FIG. 1b shows the state shortly before the assembly of the vehicle seat 8 in the inner vehicle space of the motor vehicle. In this instance, it can be seen that the adjustment mechanism 7 is located substantially below the actuation mechanism 12. The movement direction of the lower framework 10 of the vehicle seat 8 when it is assembled in the inner vehicle space is indicated in FIG. 1b by a corresponding arrow 16. This assembly movement causes a positional change of the vehicle seat with respect to the inner vehicle space and further leads to a movement of the actuation mechanism 12 which is connected to the lower framework 10 toward the adjustment mechanism 7 arranged at the floor side of the air outlet 2 which is connected to the floor of the inner vehicle space. If the actuation mechanism 12 and the adjustment mechanism 7 during assembly move into mechanical operational engagement when they are sufficiently close, the adjustment mechanism 7 slides in the embodiment of the device 1 shown along a side face of the wedge-like actuation mechanism 12 (in this instance, the left side face), which is inclined with respect to the movement direction 16 of the actuation mechanism 12, as can be seen clearly in FIG. 1b. In this instance, the actuation mechanism 12 applies a force which acts in a radial direction of the rod-like adjustment mechanism 7 to the adjustment mechanism 7, whereupon, in the case illustrated in FIG. 1a, it is displaced to the left in the direction of the rear portion x of the connection strut 15. The displacement of the adjustment mechanism 7 in turn leads as a result of the coupling to the slats 4 of the air outlet 2 to a displacement or pivoting thereof in a desired direction in such a manner that the slats 4 direct the air flow 5 discharged from the air outlet 2 forward, that is to say, in the direction of a foot/leg region of a vehicle occupant seated on the vehicle seat 8, as also indicated in FIG. 1a by the arrows 5.

FIG. 2 is a cross section of a portion of the device 1 from FIG. 1a in the first actuation position thereof shown therein along the line of section A-A shown in FIG. 1a. It can be seen that the air outlet 2 is arranged on or in a floor 17 of the inner vehicle space and is connected thereto. The air outlet shown in FIG. 2 has a total of four slats 4 which can each be pivoted about a longitudinal or pivot axis 6. The longitudinal or pivot axis 6 is in the embodiment illustrated in FIG. 2 arranged on an upper end of each slat 4. At the lower ends thereof, the individual slats 4 are also connected to each other via a common coupling element 18 which extends along all the slats 4 so as to be able to be pivotably moved. The adjustment mechanism 7 is further connected to the coupling element 18 so that a displacement of the adjustment mechanism 7 in a lateral direction (in FIG. 2 to the left or the right) leads to a synchronous pivoting of all the slats 4 about the respective longitudinal or pivot axes 6.

FIG. 2 illustrates the pivot position of the slats 4 in the first actuation position of the adjustment mechanism 7 illustrated in FIG. 1a. In FIG. 2, the air flow 5 is directed upward to the left since the foot/leg region of a vehicle occupant seated on the passenger seat 8 shown in FIG. 1a is located there.

FIG. 3 is another cross section of the same portion of the device 1 from FIG. 1a in a second actuation position along the line of section A-A shown in FIG. 1a. The illustrated second actuation position is assumed with the device 1 shown in FIG. 1a when the vehicle seat 8 in comparison with the illustration in FIG. 1a is mounted in the inner vehicle space rotated through approximately 180° about the vertical axis thereof. This is because the second actuation mechanism 12 which cannot be seen in FIG. 1a then moves into operational engagement with the adjustment mechanism 7 which can be seen in FIG. 1a in such a manner that the adjustment mechanism 7 is moved into the opposed second actuation position to the first actuation position, that is to say, is displaced to the left in FIG. 3. Accordingly, the slats 4 assume in comparison with the pivot position of the slats 4 illustrated in FIG. 2a new pivot position which is rotated in a clockwise direction and which allows the air flow 5 according to the illustration in FIG. 3 to now flow in an upward direction to the right from the air outlet 2 since the foot/leg region of a vehicle occupant on the vehicle seat 8 which has been rotated through approximately 180° about the vertical axis thereof is now located in this new direction.

FIGS. 2 and 3 show that a change of the position of the vehicle seat 8 (FIG. 1a) in the inner vehicle space as a result of the mechanical operational engagement between the two actuation mechanisms 12 and 13 which are fitted to the lower framework 10 of the vehicle seat 8 and the adjustment mechanism 7 which is coupled to the slats 4 of the air outlet 2 automatically leads to a change of the pivot position of the slats 4 of the air outlet 2 in such a manner that in the device 1 illustrated in FIG. 1a a flow against the foot/leg region of a vehicle occupant seated in the vehicle seat 8 is always ensured regardless of whether the vehicle seat 8 is installed and orientated in the inner vehicle space as illustrated in FIG. 1a or in a position which is rotated through approximately 180° about the vertical axis thereof with respect thereto. The first position of the vehicle seat 8 illustrated in FIG. 1a may correspond to a position of the vehicle seat 8 orientated in a travel direction (forward travel direction) of the motor vehicle, wherein the second position of the vehicle seat 8 rotated through approximately 180° about the vertical axis thereof then corresponds to a position facing the inner vehicle space of the vehicle. A manual adjustment of the air outlet 2 when the above-described positions of the vehicle seat 8 are changed is in the device 1 advantageously not required.

The mechanism for pivoting the slats 4 of the air outlet 2 illustrated in FIGS. 2 and 3 is intended to be understood to be only one of many possible examples. It would thus be possible, for example, for the longitudinal or pivot axis 6, about which the respective slats 4 can be pivoted, also to be arranged at the lower end of each slat 4 and for the coupling element 18 to be pivotably connected thereto at the respective upper ends of the slats 4. In this instance, a lateral displacement of the adjustment mechanism 7 which is coupled to the coupling element 18 as shown in FIG. 2 to the right would lead to a pivot position of the slats 4 as shown in FIG. 3. A displacement of the adjustment mechanism 7 as shown in FIG. 3 to the left would accordingly lead to a pivot position of the slats 4 shown in FIG. 2.

It is also conceivable and included to arrange the longitudinal or pivot axis 6 at the center of the respective slats 4 so that the portions of each slat 4 which extend at both sides of the longitudinal or pivot axis 6 which is arranged in this manner to the respective slat edges or ends are approximately of the same size.

Alternatively to a displacement movement of the adjustment mechanism 7, this could also be coupled to the slats 4 of the air outlet 2 in such a manner that a change of the pivot position of the slats 4 is brought about by means of a rotation of the adjustment mechanism 7. Such an air outlet is illustrated by way of example in FIG. 4.

FIG. 4 is a perspective view of an air outlet 19 of another embodiment of a device. Transversely over the air discharge opening 3 of the air outlet 19 there extend in the example illustrated three slats 4 which are supported so as to be able to be pivotably moved. These slats are again coupled to each other in such a manner that a rotation or pivoting which is brought about by an adjustment mechanism 20 which is rotatable in this example on one of the slats 4 is synchronously also transmitted to the other two slats 4 in order to control the air flow being discharged from the air discharge opening 3 accordingly in a desired direction. The adjustment mechanism 20 is coupled to the slats 4 in order to transmit the rotation via an adjustment shaft 21. FIG. 4 further shows that the air outlet 19 is integrated in an air guiding channel 22, of which only a portion can be seen in FIG. 4. The air guiding channel 22 is as a result of its flat, relatively wide cross section particularly suitable for being laid on or in the floor of an inner vehicle space and fitted at that location in order to arrange the air outlet 19 in a similar manner to the air outlet 2 of the device 1 shown in FIG. 1*a* below a vehicle seat 8 with all the accompanying properties and advantages which are explained herein.

With reference to FIGS. 5*a*-5*c*, 6*a*-6*c*, 7*a*-7*c* and 8*c*-8*c* explained below, the mechanical operational engagement which occurs during the assembly operation of the vehicle seat 8 illustrated in FIG. 1*a* in the inner vehicle space of the motor vehicle between the actuation elements 12 and 13 fitted to the vehicle seat 8 and the adjustment element 7 which is coupled to the slats 4 of the air outlet 2 is described in detail. FIGS. 5*a*-5*c*, 6*a*-6*c*, 7*a*-7*c* and 8*c*-8*c* each illustrate the assembly time shortly before the operational engagement which occurs between the actuation mechanisms 12 and 13 with the adjustment mechanism 7.

FIGS. 5*a*-8*c* represent as two different partial side views (b) and (c) a first and a second actuation position of an embodiment of a device according to embodiments of the invention, respectively. The partial side view illustrated in FIGS. 5*a*, 6*a*, 7*a* and 8*a* in contrast illustrates a comparison example which is not in accordance with the invention and which only serves a better understanding of the embodiment of the device according to the invention which is illustrated in each case in FIGS. 5*b*, 5*c*, 6*b*, 6*c*, 7*b*, 7*c*, 8*b* and 8*c* for comparison purposes. The comparison examples illustrated in each case in the views of FIGS. 5*a*, 6*a*, 7*a* and 8*a* are identical.

FIG. 5*b* is a partial side view of the device 1 illustrated in FIG. 1*a* in the first actuation position thereof shown therein and FIG. 5*c* is a partial side view of the same device 1 in the second actuation position thereof. The respective side views FIG. 5*b* and FIG. 5*c* correspond to a view of the side portion of the device 1 illustrated in FIG. 1*a* in the foreground from the outer side, that is to say, consequently from a direction opposite the viewing direction defined by the line of section A-A drawn in FIG. 1*a*.

The comparison example not in accordance with the invention illustrated in FIG. 5*a* shows the horizontal connection strut 15 of the lower framework 10 of the vehicle seat 8 illustrated in FIG. 1*a*, the actuation mechanism 12 which is secured thereto and the adjustment mechanism 7 of the air outlet 2 illustrated in FIG. 1*a*. As also illustrated in FIG. 1*a*, the connection strut 15 is orientated in FIG. 5*a* in such a manner that the rear portion x thereof is located in the left half of the image of FIG. 5*a* and the front portion y thereof is located in the right half of the image of FIG. 5*a*. A viewing direction of a vehicle occupant seated in the vehicle seat 8 which is connected to the lower framework 10 which is orientated in this manner is indicated by a directional arrow 22. A viewing direction 22 to the right as illustrated in FIGS. 5*a*-8*c* represents in this instance a viewing direction of the vehicle occupant in the travel direction (forward travel direction) of the motor vehicle, whereas a viewing direction 22 to the left as illustrated in FIGS. 5*a*-8*c* represents a viewing direction counter to the travel direction (forward travel direction) of the motor vehicle, thus accordingly into the inner vehicle space.

In the comparison example illustrated in FIG. 5*a*, the actuation mechanism 12 is orientated with respect to the entire length of the horizontal connection strut 15 precisely centrally, in the same manner as the adjustment mechanism 7. Accordingly, the length of the rear portion $x_a$ is equal to the length of the front portion $y_a$ of the connection strut 15 ($x_a=y_a$). The reference point of the central orientation of the adjustment mechanism 7 corresponds in the illustration of FIGS. 5*a*-5*c* to the center point of the circular adjustment mechanism cross section, the reference point of the actuation mechanism 12 with respect to the central orientation corresponds to the actuation mechanism contact location (in this instance, the lower tip of the illustrated triangular/wedge-like actuation mechanism) at the time of the mechanical operational engagement which occurs between the actuation mechanism 12 and 13 and the adjustment mechanism 7.

The adjustment mechanism 7 which in this instance is constructed at least in the engagement region with the actuation mechanism 12 in a rod-like manner with a circular cross section has a diameter d. As a result of the central arrangement both of the actuation mechanism 12 and of the adjustment mechanism 7, an operational engagement between the actuation mechanism 12 and the adjustment mechanism 7 can be produced, that is to say, an operational engagement which would lead to a lateral displacement of the adjustment mechanism 7 clearly defined with respect to a displacement direction substantially parallel with the connection strut 15. Therefore, such an arrangement illustrated in FIG. 5a also does not correspond to an embodiment according to the invention.

FIG. 5b illustrates the region of the horizontal connection strut 15 of the device 1 illustrated in FIG. 1a. It can be seen that the actuation mechanism 12 is arranged eccentrically with respect to the overall length of the connection strut 15 ($x_b \neq y_b$). In particular, the actuation mechanism 12 in the shown embodiment of the device 1 in comparison with the illustration in FIG. 5a is arranged further forward on the connection strut 15, that is to say, $x_b > y_b$. The offset of the actuation mechanism 12 of the device 1 in comparison with the comparison example illustrated in FIG. 5a corresponds in this instance approximately to d/2, but is not limited thereto. The only important aspect is that, when the operational engagement occurs between the actuation mechanism 12 and the adjustment mechanism 7, a lateral displacement of the adjustment mechanism 7 which is clearly determined with respect to the displacement direction is ensured.

The adjustment mechanism 7 is in the embodiment illustrated in FIG. 5b arranged centrally, as can readily be seen from the comparison with FIG. 5a. The central position of the adjustment mechanism 7 corresponds in the embodiment of the device 1 illustrated in FIG. 5a to a neutral position already explained herein of the slats 4 of the air outlet 2 which are coupled to the adjustment mechanism 7. In the neutral position, the slats 4 of the air outlet 2 are orientated substantially perpendicularly to the opening plane of the air discharge opening 3 so that the air flow 5 flowing through the air discharge opening 3 can also flow out substantially perpendicularly to the opening plane of the air discharge opening 3.

In the event of continued assembly movement of the vehicle seat 8 and consequently of the connection strut 15, as takes place from the illustration in FIG. 5b in the assembly direction 23, the operational engagement between the actuation mechanism 12 and the adjustment mechanism 7 leads to a lateral displacement of the adjustment mechanism 7 in the direction of the left half of the image of FIG. 5b counter to the viewing direction 22 approximately as far as the point at which the adjustment mechanism 7 which is indicated in FIG. 5b with a dashed peripheral line is illustrated. This position of the adjustment mechanism 7 assumed after the assembly of the vehicle seat 8 in the inner vehicle space corresponds to the first actuation position of the adjustment mechanism 7 shown in FIG. 1a, in which position the slats 4 of the air outlet 2 assume a pivot position which directs the air flow 5 flowing out of the air discharge opening 3 in the viewing direction 22 of the vehicle occupant seated in the vehicle seat 8 and consequently into the foot/leg region thereof (see also FIG. 2).

FIG. 5c illustrates the assembly situation of the vehicle seat 8 shortly before the beginning of operational engagement between the actuation mechanism 12 and the adjustment mechanism 7 from the same viewing position as in FIG. 5b, but with the vehicle seat 8 rotated through 180° about the vertical axis thereof. Accordingly, the left-side actuation mechanism 13 which is fitted to the left-side connection strut 15 of the lower framework 10 with respect to the viewing direction 22 can now be seen in FIG. 5c.

In the event of continued assembly movement of the vehicle seat 8 and consequently of the connection strut 15, as takes place from the illustration in FIG. 5c in the assembly direction 23, the operational engagement between the actuation mechanism 13 and the adjustment mechanism 7 leads to a lateral displacement of the adjustment mechanism 7 in the direction of the right half of the image of FIG. 5c counter to the viewing direction 22 approximately as far as the point at which the adjustment mechanism 7 which is indicated in FIG. 5c with a dashed peripheral line is illustrated. This position of the adjustment mechanism 7 assumed after the assembly of the vehicle seat 8 in the inner vehicle space corresponds to the second actuation position of the adjustment mechanism 7 in which the slats 4 of the air outlet 2 assume a pivot position which again directs the air flow 5 flowing out of the air discharge opening 3 in the viewing direction 22 of the vehicle occupant seated in the vehicle seat 8 and consequently into the foot/leg region thereof (see also FIG. 3). With respect to the inner vehicle space, this means a reversal of the flow direction of the air flowing out of the air discharge opening 3 of the air outlet 2.

In the device 1 illustrated in FIGS. 5b and 5c, the connection struts 15 are constructed symmetrically with respect to the arrangement of the actuation mechanisms 12 and 13, that is to say, $x_c = x_b$ and $y_c = y_b$. However, the eccentric arrangement of the two actuation mechanisms 12 and 13 when the vehicle seat 8 is rotated through 180° about the vertical axis thereof enables a clearly defined displacement of the adjustment mechanism 7 into the first or second actuation position depending on the selected orientation of the vehicle seat 8 in the inner vehicle space.

It should be noted that, with the device 1 illustrated in FIGS. 5b and 5c, the adjustment mechanism 7 is resiliently loaded in the direction of the (in this instance central) neutral position thereof. That is to say, the adjustment mechanism 7 after the disassembly of the vehicle seat 8 automatically returns to the neutral position thereof again.

FIGS. 6b and 6c illustrate a first and second actuation position of the adjustment mechanism 7 of another embodiment of a device 24. With the exception of the differences shown in FIGS. 6b and 6c and a different construction of the air outlet, the device 24 is constructed in a substantially identical manner to the device 1 shown in FIG. 1a.

As can be seen in FIG. 6b, the actuation mechanism 12 in this embodiment of the device 24 is also arranged eccentrically, but in comparison with the central arrangement in the comparison example of FIG. 6a further to the rear on the connection strut 15, that is to say, $x_b < y_b$. The offset of the actuation mechanism 12 of the device 24 from the center corresponds in this instance approximately to d/2, but is not limited to this. The only important aspect is that, when the operational engagement occurs between the actuation mechanism 12 and the adjustment mechanism 7, a clearly determined lateral displacement of the adjustment mechanism 7 with respect to the adjustment direction is ensured.

Since the adjustment mechanism 7 in the device 24 is further arranged centrally, the operational engagement between the actuation mechanism 12 and the adjustment mechanism 7 in the event of continued assembly movement 23 from the illustration of FIG. 6b brings about a displacement of the adjustment mechanism 7 in the direction of the viewing direction 22 (right half of the image of FIG. 6b). The position of the adjustment mechanism 7 assumed after the assembly of the vehicle seat 8 in FIG. 6b corresponds to the first actuation position of the device 24 in which the air flow which is discharged from the air discharge opening of an alternative air outlet which is not illustrated in the figures but which is mentioned in connection with the description of the air outlet 2 illustrated in FIGS. 2 and 3 is also directed in viewing direction 22 and consequently into the foot/leg region of the vehicle occupant seated on the passenger seat 8.

FIG. 6c illustrates the possible second actuation position of the adjustment mechanism 7 of the device 24 after the assembly of the vehicle seat 8 with the orientation of the vehicle seat 8 rotated through 180° about the vertical axis thereof in comparison with the illustration in FIG. 6b. Since the arrangement of the actuation mechanism 13 on the left-side connection strut 15 of the vehicle seat 8 is also in the case of the device 24 symmetrical relative to the arrangement of the actuation mechanism 12 on the right-side connection strut 15 of the vehicle seat 8, that is to say, $x_c = x_b$ and $y_c = y_b$, the actuation mechanism 13 in the illustration of FIG. 6c brings about a lateral displacement of the adjustment mechanism 7 in the viewing direction 22, but to the left half of the image of FIG. 6c and consequently in the opposite direction to the displacement direction of the adjustment mechanism 7 illustrated in FIG. 6b. This second actuation position of the adjustment mechanism 7 leads to a reversal of direction of the air flow brought about in comparison with the first actuation position and consequently also to flow being applied to the foot/leg region of the vehicle occupant seated in the vehicle seat 8. In the embodiment of the device 24 shown in FIGS. 6b and 6c, the adjustment mechanism 7 is also resiliently loaded in the direction of the (in this instance central) neutral position thereof.

FIGS. 7b and 7c illustrate a first and second actuation position of the adjustment mechanism 7 of yet another embodiment of a device 25. With the exception of the differences shown in FIGS. 7b and 7c, the device 25 substantially corresponds to the structure of the device 1 shown in FIG. 1a.

As can be seen in FIG. 7b, in this embodiment both the actuation element 12 and the adjustment mechanism 7 which is illustrated in the neutral position thereof with a solid circle are arranged eccentrically. For the arrangement of the actuation mechanism 12 on the connection strut 15, $x_b < y_b$ applies in this instance, that is to say, the actuation mechanism 12 is arranged offset further to the rear with respect to the center of the connection strut 15. The adjustment mechanism 7 is as shown in FIG. 7b displaced as a result of the assembly-related operational engagement with the actuation mechanism 12 counter to the viewing direction 22 (to the left half of the image of FIG. 7b) and reaches the first actuation position of the device 25 at the position of the adjustment mechanism 7 which is illustrated in FIG. 7b with a dashed circular outline and which as with the device 1 brings about a flow to the foot/leg region of a vehicle occupant seated on the passenger seat 8 with the air outlet 2 illustrated, for example, in FIGS. 2 and 3.

FIG. 7c again shows the assembly situation when the vehicle seat 8 is installed with an orientation which is rotated through 180° about the vertical axis thereof in comparison with the illustration in FIG. 7b. However, since the neutral position of the adjustment mechanism 7 shown in FIG. 7b is arranged eccentrically in the device 25, the arrangement of the actuation mechanism 13 on the left-side connection strut 15 of the lower framework 10 is no longer symmetrical relative to the arrangement of the actuation mechanism 12 on the right-side connection strut 15. While the arrangement of the actuation mechanism 12 on the right-side connection strut 15 as shown in FIG. 7b is offset from the center thereof toward the rear ($x_b < y_b$), the arrangement of the actuation mechanism 13 on the left-side connection strut 15 as shown in FIG. 7c with respect to the center of the connection strut 15 is arranged offset to the front so that for the arrangement of the actuation mechanism 13 on this connection strut 15, $x_c > y_c$ applies in order to be able to ensure the displacement of the adjustment mechanism 7 in the assembly situation shown in FIG. 7c counter to the viewing direction 22, that is to say, in the direction of the right image half of FIG. 7c. In the embodiment of the device 25 shown in FIGS. 7b and 7c, the adjustment mechanism 7 is also resiliently loaded in the direction of the (in this instance eccentric) neutral position thereof.

FIGS. 8b and 8c illustrate a first and second actuation position of the adjustment mechanism 7 of yet another embodiment of a device 26. With the exception of the differences shown in FIGS. 8b and 8c, the device 26 substantially corresponds to the structure of the device 24 explained in connection with the description of FIGS. 6b and 6c.

With the device 26 illustrated in FIG. 8b, both the actuation mechanism 12 and the adjustment mechanism 7 are also arranged eccentrically in the neutral position thereof illustrated with a solid circle. For the arrangement of the actuation mechanism 12 on the connection strut 15 of the device 25, $x_b < y_b$ applies in this instance, that is to say, the actuation mechanism 12 is arranged offset further to the rear with respect to the center of the connection strut 15. However, the engagement brought about as a result of the assembly of the vehicle seat 8 between the actuation mechanism 12 and the adjustment mechanism 7 displaces it according to the illustration in FIG. 8b in the viewing direction 22, that is to say, to the right image half of FIG. 8b, which illustrates the first actuation position of the adjustment mechanism 7 of the device 26. The action of this first actuation position of the device 26 corresponds to the action of the first actuation position of the device 24 illustrated in connection with the description of FIGS. 6b and 6c.

FIG. 8c again shows the assembly situation when the vehicle seat 8 is installed with an orientation which is rotated through 180° about the vertical axis thereof in comparison with the illustration in FIG. 8b. However, since the neutral position of the adjustment mechanism 7 illustrated in FIG. 8b is arranged eccentrically in the case of the device 26, the arrangement of the actuation mechanism 13 on the left-side connection strut 15 of the lower framework 10 is also not symmetrical relative to the arrangement of the actuation mechanism 12 on the right-side connection strut 15. While the arrangement of the actuation mechanism 12 on the right-side connection strut 15 is as shown in FIG. 8b offset from the center thereof to the rear ($x_b < y_b$), the arrangement of the actuation mechanism 13 on the left-side connection strut 15 as shown in FIG. 8c is arranged offset to the front with respect to the center of this connection strut 15 so that for the arrangement of the actuation mechanism 13 on this connection strut 15 $x_c > y_c$ applies in order also to be able to ensure the displacement of the adjustment mechanism 7 in the assembly situation shown in FIG. 8c in the viewing direction 22, that is to say, in the direction of the left half of the image of FIG. 8c. In the embodiment of the device 26 shown in FIGS. 8b and 8c, the adjustment mechanism 7 is also resiliently loaded in the direction of the (in this instance eccentric) neutral position thereof.

The above-described device for controlling the air discharge from an air outlet of a heating and/or ventilation and/or air-conditioning (HVAC) system of a motor vehicle is not limited to the embodiments disclosed herein, but instead also includes additional embodiments which have the same effect. The actuation mechanism may thus, for example, deviate from the wedge shape illustrated in particular in FIGS. 5b, 5c, 6b, 6c, 7b, 7c, 8b and 8c, for example, with respect to the inclination angle of the side faces thereof or with respect to a geometry of the first contact region thereof which is particularly suitable at the time of the initial operational engagement with the adjustment mechanism, and the like. The first contact region of the actuation mechanism may, for example, have a correspondingly suitable curvature.

Furthermore, it can be seen from FIGS. 5b, 5c, 6b, 6c, 7b, 7c, 8b and 8c that with the wedge-like actuation mechanism 12 and 13 shown therein only one of the two side faces thereof always moves into operational engagement with the adjustment mechanism 7. Accordingly, the actuation mechanisms 12, 13 may be freely constructed on the side face thereof which is not involved in the operational engagement with the adjustment mechanism 7. It would thus also be possible for the actuation mechanisms 12, 13 which are illustrated, for example, to be reduced to half of the cross-sectional surface-area by the half of the actuation mechanisms 12, 13 which provides the side face which is not involved in the operational engagement being completely omitted. It is also conceivable to provide the actuation mechanisms in forms other than a wedge-like form, according to other embodiments.

In one embodiment, the device according to the invention for controlling the air discharge from an air outlet of a heating and/or ventilation and/or air-conditioning system in a motor vehicle is in a particularly preferred manner used in a motor vehicle having at least one vehicle seat which can be mounted with different orientations.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A device for controlling air flow from a heating and/or ventilation and/or air-conditioning system of a motor vehicle, comprising:
   an air outlet having an air discharge opening for discharging air into an inner vehicle space;
   at least one elongate slat extending over the air outlet and pivotable about a longitudinal axis to influence the air flow flowing through the air discharge opening and having a pivot position that can be adjusted by at least one adjustment mechanism coupled to the slat, wherein the adjustment mechanism has a rod-shaped elongate structure with a round cross section; and
   at least one actuation mechanism fitted to a vehicle seat which when the vehicle seat is mounted in the inner vehicle space moves into mechanical operational engagement with the adjustment mechanism and brings about an adjustment of the at least one slat in accordance with a position of the vehicle seat with respect to the inner vehicle space, wherein the at least one actuation mechanism has a wedge-shaped structure that narrows from one end to another with side faces, wherein the at least one actuation mechanism corn vises at least two actuation mechanisms, wherein the at least two actuation mechanisms are fitted to the vehicle seat, wherein a first actuation mechanism of the at least two actuation mechanisms when the vehicle seat is assembled in a first position moves into mechanical operational engagement with the adjustment mechanism and displaces the first actuation mechanism in a first actuation direction as far as a first actuation position, and a second actuation mechanism of the at least two actuation mechanisms when the vehicle seat is assembled in a second position moves into mechanical operational engagement with the adjustment mechanism and displaces the second actuation mechanism in a second actuation direction counter to the first actuation direction as far as a second actuation position.

2. The device as claimed in claim 1, wherein the vehicle seat can be assembled in at least two different positions in the inner vehicle space, wherein the vehicle seat in the first position is orientated substantially in the travel direction of the motor vehicle and in the second position is orientated substantially counter to the travel direction of the motor vehicle.

3. The device as claimed in claim 1, wherein an adjustment path of the adjustment mechanism between a first actuation position and a second actuation position includes a neutral position in which the at least one slat of the air outlet assumes a pivot position in which the air flow flowing through the air discharge opening flows out substantially perpendicularly to an opening plane of the air discharge opening.

4. The device as claimed in claim 1, wherein the adjustment mechanism is resiliently loaded in a direction of a neutral position thereof.

5. The device as claimed in claim 1, wherein the vehicle seat has a lower framework which carries a seat face and to which the at least one actuation mechanism is fitted.

6. The device as claimed in claim 1, wherein a lower framework of the vehicle seat after assembly in the inner vehicle space is retained to be secured in terms of movement with respect to the inner vehicle space.

7. The device as claimed in claim 1, wherein the air outlet is arranged below the vehicle seat.

8. The device as claimed in claim 1, wherein the adjustment mechanism is constructed with the elongate structure at least in an engagement region with the at least one actuation mechanism and the at least one actuation mechanism for the operational engagement with the adjustment mechanism applies a force thereto in a radial direction of the adjustment mechanism.

9. The device as claimed in claim 1, wherein an adjustment of the at least one slat is produced as a result of a relative movement between the at least one actuation mechanism, which is in operational engagement with the adjustment mechanism, and the adjustment mechanism, during which the adjustment mechanism slides along a side face of the actuation mechanism which extends obliquely relative to a movement direction of the actuation mechanism.

10. A vehicle HVAC air flow control device, comprising:
    an air outlet having an air discharge opening;
    an elongate slat extending over the outlet and pivotable about a longitudinal axis to influence air flow flowing through the opening;
    an adjustment mechanism, wherein the adjustment mechanism has a rod-shaped elongate structure with a round cross section; and
    an actuation mechanism fitted to a vehicle seat which moves into engagement with the adjustment mechanism to adjust a position of the slat based on a position of the vehicle seat, wherein the actuation mechanism has a wedge-shaped structure that narrows from one end to another with side faces, wherein the at least one actuation mechanism comprises at least two actuation mechanisms, wherein at least two actuation mechanisms are fitted to the vehicle seat, wherein a first actuation mechanism of the at least two actuation mechanisms when the vehicle seat is assembled in a first position moves into mechanical operational engagement with the adjustment mechanism and displaces the first actuation mechanism in a first actuation direction as far as a first actuation position, and a second actuation mechanism off the at least two actuation mechanisms when the vehicle seat is assembled in a second position moves into mechanical operational engagement with the adjustment mechanism and displaces the second actuation mechanism in a second actuation direction counter to the first actuation direction as far as a second actuation position.

11. The device as claimed in claim 10, wherein the vehicle seat can be assembled in at least two different positions in the inner vehicle space, wherein the vehicle seat in a first position is orientated substantially in a travel direction of the motor vehicle and in a second position is orientated substantially counter to the travel direction of the motor vehicle.

12. The device as claimed in claim 10, wherein an adjustment path of the adjustment mechanism between a first actuation position and a second actuation position includes a neutral position in which the at least one slat of the air outlet assumes a pivot position in which the air flow flowing through the air discharge opening flows out substantially perpendicularly to an opening plane of the air discharge opening.

13. The device as claimed in claim 10, wherein the adjustment mechanism is resiliently loaded in a direction of a neutral position thereof.

14. The device as claimed in claim 10, wherein the vehicle seat has a lower framework which carries a seat face and to which the at least one actuation mechanism is fitted.

15. The device as claimed in claim 10, wherein a lower framework of the vehicle seat after assembly in the inner vehicle space is retained to be secured in terms of movement with respect to the inner vehicle space.

16. The device as claimed in claim 10, wherein the air outlet is arranged below the vehicle seat.

17. The device as claimed in claim 10, wherein the adjustment mechanism is constructed in with the elongate structure at least in an engagement region with the actuation mechanism and the actuation mechanism for the operational engagement with the adjustment mechanism applies a force thereto in a radial direction of the adjustment mechanism.

18. The device as claimed in claim 10, wherein an adjustment of the at least one slat is produced as a result of a relative movement between the actuation mechanism, which is in operational engagement with the adjustment mechanism, and the adjustment mechanism, during which the adjustment mechanism slides along a side face of the actuation mechanism which extends obliquely relative to a movement direction of the actuation mechanism.

* * * * *

UNITED STATES PATENT AND TRADEMARK OFFICE
CERTIFICATE OF CORRECTION

PATENT NO. : 10,953,729 B2
APPLICATION NO. : 16/108764
DATED : March 23, 2021
INVENTOR(S) : Cronin et al.

Page 1 of 1

It is certified that error appears in the above-identified patent and that said Letters Patent is hereby corrected as shown below:

In the Claims

Column 17;
Claim 1, Lines 55-56:
"corn vises" should be --comprises--.

Column 19;
Claim 10, Line 2:
"off" should be --of--.

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*